United States Patent [19]

Kennel

[11] 4,448,086
[45] May 15, 1984

[54] TEMPERATURE CONTROLLED GYRO

[75] Inventor: John M. Kennel, Santa Ana, Calif.

[73] Assignee: The United States of America as represented by the Secretary of the Air Force, Washington, D.C.

[21] Appl. No.: 380,451

[22] Filed: May 20, 1982

[51] Int. Cl.³ .............................................. G01C 19/04
[52] U.S. Cl. ........................................ 74/5 R; 74/5.5
[58] Field of Search .................. 74/5 R, 5.5; 33/327, 33/315

[56] References Cited

U.S. PATENT DOCUMENTS

| | | | |
|---|---|---|---|
| 2,752,791 | 7/1956 | Jarosh et al. | 74/5.5 X |
| 2,840,366 | 6/1958 | Wing | 264/1 |
| 2,937,533 | 5/1960 | Barkalow | 74/5.5 |
| 2,973,647 | 3/1961 | Smith et al. | 73/497 |
| 3,001,407 | 9/1961 | Wiancko et al. | 73/497 |
| 3,004,436 | 10/1961 | Katz | 74/5 |
| 3,031,892 | 5/1962 | Krupick | 74/5.5 |
| 3,112,651 | 12/1963 | Zingary | 74/5 |
| 3,132,523 | 5/1964 | Katz | 74/5 |
| 3,200,653 | 8/1965 | Wing | 74/5 |
| 3,240,074 | 3/1966 | Horgan et al. | 74/5 |

FOREIGN PATENT DOCUMENTS 878297  9/1961  United Kingdom ................. 74/5 R

OTHER PUBLICATIONS

"Temperature Control of the Inertial-Grade Floated Rate-Integrating Gyroscope", K. W. Kaiser, *IEEE Transactions on Automatic Control*, vol. AC-15, No. 5, Oct. 1970, pp. 521-529.

Primary Examiner—Rodney H. Bonck
Attorney, Agent, or Firm—Donald J. Singer; Frank J. Lamattina

[57] ABSTRACT

A method of, and apparatus for, eliminating the error-causing heat convections of a liquid which is disposed between a warm cylindrical float that houses a navigational gyro and a cool cylindrical gyro case that houses the float. The method includes the performance of steps which result in raising the temperature of the gyro case to the temperature of the float. The apparatus includes a temperature controller assembly which further includes temperature sensitive resistors to ascertain the temperatures respectively, of the float and of the gyro case; a differential amplifier to ascertain the difference in the temperatures; and a heater coil surrounding the gyro case to heat the case to the higher temperature of the float.

12 Claims, 3 Drawing Figures

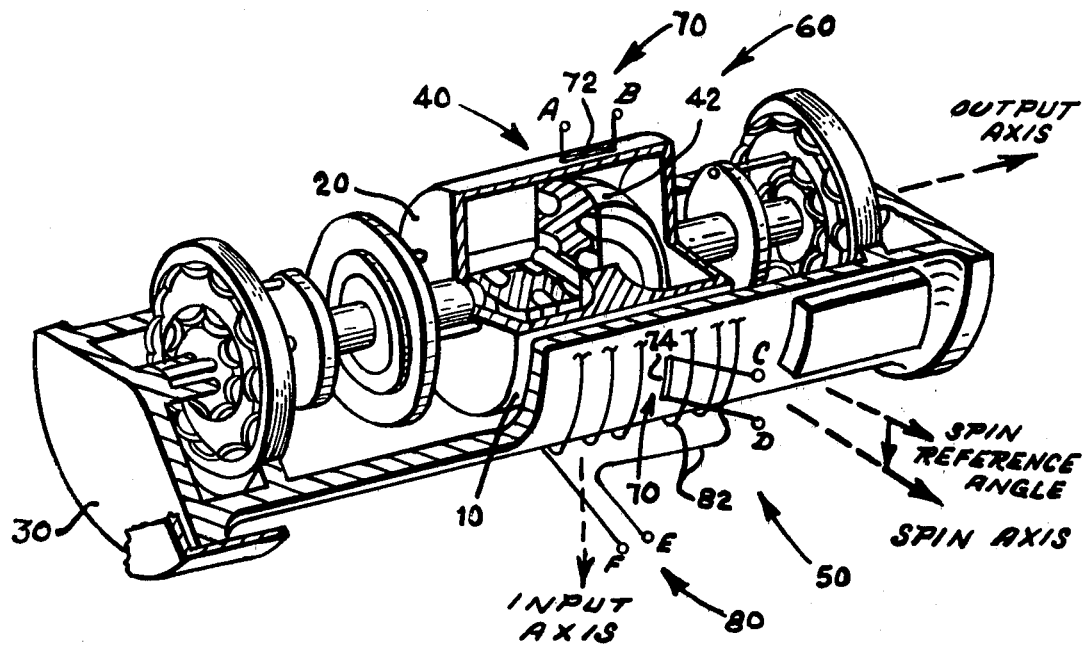
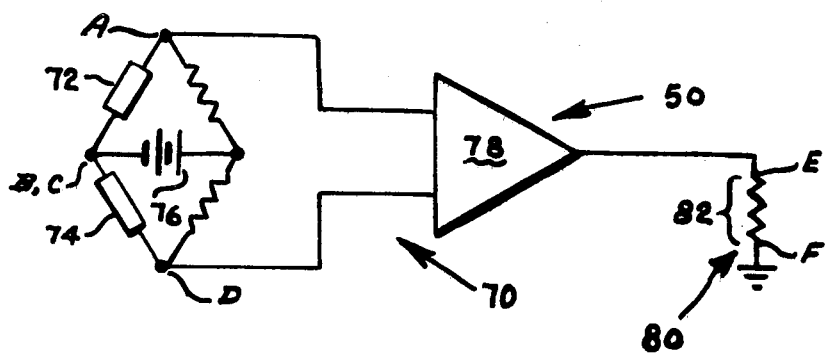
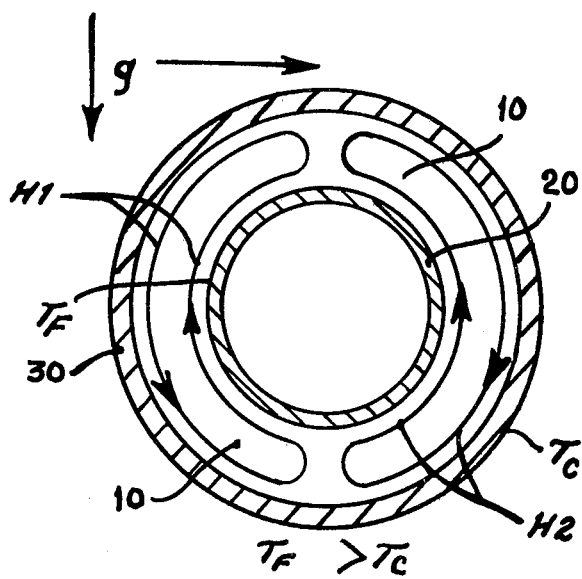

TEMPERATURE CONTROLLED GYRO

STATEMENT OF GOVERNMENT INTEREST

The invention described herein may be manufactured and used by or for the Government for governmental purposes without the payment of any royalty thereon.

BACKGROUND OF THE INVENTION

The instant invention relates to gyroscopes and, more particularly, to controlling heat convections of a fluid that supports a sealed inner container which houses a navigational gyroscope.

Precision gyros used in inertial navigation equipment are designed with a low friction output axis bearing so that gyro precision is not falsely indicated by gyro case rotation. A commonly used aid in making a low friction output axis bearing is the relief of bearing loads by enclosing the gyro wheel and motor in a sealed container and surrounding this container with a liquid. The output axis bearing may be jewel and pivot, a magnetic bearing, or of some other type. The design of the gyro wheel container is such that it is of the same density as the liquid in which it is immersed. This wheel container is therefore called a "float." To the degree that the float density matches the fluid density, gravity and acceleration forces on the float are cancelled by buoyancy forces. Thus, bearing loads are made very small.

Although floatation is a great benefit to the output axis bearing, the fluid is a source of error torque on the float. A temperature gradient has been recognized as a source of convection in the fluid and of viscous torque on the gyro. In order to keep such torque constant, temperature control of the gyro is used. It is found that temperature sensitivity (that is, gyro drift change per degree change in temperature or temperature gradient) is large compared to desired accuracy so that very precise temperature control is required. Gyro temperature sensitivity has been analyzed by assuming that the fluid gap is sufficiently small that a mean temperature may be used and that the significant feature is the difference in the mean fluid temperature across the gyro.

Detailed examination of heat convection currents (hereinafter referred to as "convections" or "heat convections") show that convection fluid velocity is proportional to the temperature difference across the fluid gap between the float and the case. Convection can be supressed by controlling temperature such that the temperature of the gyro case adjacent to the fluid is held at the same temperature as the gyro float. Gyro temperature control in this manner will reduce gyro temperature sensitivity to a small fraction of present values by largely eliminating convection and resulting torque variations with temperature variation.

Specifically, a floated gyro has a very narrow fluid gap, with 0.005 to 0.010 of an inch being typical. The fluid is dense and viscous. Temperature difference across the fluid gap is typically from approximately 5 degrees to approximately 10 degrees. Temperature asymetries arise from changes in ambient air temperature. The above-mentioned torque variation can be reduced to a very small and insignificant value by controlling temperature, so that the temperature difference across the fluid gap is zero or near zero.

Therefore, what is needed in the art and is not presently available is some way to maintain the temperature difference across the fluid gap to zero or near zero.

SUMMARY OF THE INVENTION

The instant invention fulfills the aforementioned need, and thereby constitutes a significant advance in the state-of-the-art, by providing a unique method of, and an apparatus for, maintaining the temperature difference across the aforesaid fluid gap to zero, or at least near zero.

Briefly stated, the method portion of the instant invention comprises steps by which the respective temperatures of the warmer inner container, (i.e., the float) and of the cooler outer container, (i.e., the gyro case) are ascertained; the difference in temperature is determined; and, the lower temperature of the outer container is brought up to equal the higher temperature of the inner container by heating the outer container.

Oversimplified, the apparatus portion of the instant invention comprises a new navigational gyroscope system which includes a novel temperature controller assembly that further includes: means for sensing the difference in temperatures of the warmer inner container, (i.e., the float) and of the cooler outer container (i.e., the gyro case); and, means for raising the temperature of the outer container to the temperature of the inner container.

Accordingly, it is an object of the instant invention to eliminate the error-causing heat convections of a fluid interposed between a sealed inner container (i.e., the float) which houses a gyroscope (e.g., a navigational gyroscope) and a sealed outer container (i.e., the gyro case), wherein the temperature of the inner container is greater than the temperature of the outer container.

It is another object of this invention to attain the elimination of the error-causing heat convections of said fluid by raising the temperature of the outer container (i.e., gyro case) to the temperature of the inner container (i.e., the float).

It is still another object of the instant invention to provide a novel method of, and a unique apparatus for, accomplishing all of the above.

These objects of this invention, as well as other objects related thereto (such as attaining all of the foregoing easily, quickly, inexpensively, and relibly) will become readily apparent after a consideration of the description of the instant invention, together with reference to the contents of the Figures of the drawing.

DESCRIPTION OF THE DRAWING

FIG. 1 is a side elevation view, in simplified schematic form and in cross section, of a warmer inner cylindrical container (e.g. a gyro float), a cooler outer cylindrical container (e.g., a gyro case) which houses the inner container, and error-causing heat convections of a fluid which is interposed between the containers;

FIG. 2 is a perspective view, in simplified pictorial and schematic form, of a typical navigational gyroscope assembly with which has been incorporated a preferred embodiment of the apparatus portion of the instant invention, thereby resulting in a new and unique navigational gyroscope system; and FIG. 3 is an enlarged representation, in schematic form, of the temperature controller assembly constituent of the apparatus portion of the instant invention.

It is to be noted that the Figures of the drawing shown, in their totality, the result of practising the steps of the method portion of the instant invention.

DESCRIPTION OF THE INVENTION

As a preliminary matter and with reference to FIG. 1, it is to be noted and remembered that an object of the instant invention is to eliminate the error-causing heat convections, such as H1 and H2, of a fluid, such as liquid 10, interposed between a sealed inner container, such as cylindrical gyro float 20, which houses the gyroscope (not shown in FIG. 1) and a sealed outer container, such as cylindrical gyro case 30, wherein the temperature of the inner container $T_F$ is greater than the temperature of the outer container $T_C$.

As shown by legend in FIG. 1, the temperature $T_F$ of that cylindrical float 20 is higher than the temperature $T_C$ of the cylindrical gyro case 30. As a result, the fluid 10, between the float 20 and the gyro case 30, flows up along the hot external surface of the wall of the float 10, turns near the top, and flows down the cold internal surface wall of the gyro case 30, thereby causing and maintaining the heat convection (flows) H1 and H2. If, as shown, the cylinders 20 and 30 are horizontal, and if the temperature of the wall of the cylinder 30 is uniform, i.e., the same all around the cylinder, then there will be two similar convective flow patterns, such H1 and H2, on opposite sides between the cylinders 20 and 30. Since flow velocity is proportioned to temperature difference, viscous drag on the inner cylinder 20 will cause a lift (not shown).

It is to be noted that, if any temperature assymetry is introduced (such, as for example, a temperature difference on different portions of the wall of the outside container 30), the temperature difference of the inner and outer containers 20 and 30 will be larger at one portion (e.g., one side) than on another portion (e.g., the other side). In this situation, the fluid velocity will be greater on the side with the larger temperature difference, and the flow patterns H1 and H2 will no longer be symmetric. The convective flow due to the larger temperature difference will extend more than half way around the cylinder (not shown, in the interest of maintaining simplicity of the Figure). In this situation, the inner cylinder 20 will sense not only lift, but also a net torque (not shown). The torque results from the unbalanced viscous drag on two sides.

Now, with reference to FIGS. 2 and 3, it is to be noted that the junctions of the electrical circuit shown therein have been designated A, B, C, D, E and F, to better orient the reader.

Again with reference to FIG. 2, therein is shown a preferred embodiment of the instant invention. More specifically and more accurately, therein is shown a typical navigational gyroscope assembly 40 with which has been incorporated a preferred embodiment of the apparatus portion 50 (i.e., a temperature controller assembly) of the instant invention, thereby resulting in a new navigational gyroscope system 60.

The inventive navigational gyroscope system 60 includes: a navigational gyroscope, generally designated 42; a sealed inner container 20 (i.e., the float) which houses the gyroscope 42, a sealed outer container 30 (i.e., the gyro case) which houses the inner container 20; a fluid (e.g., a liquid, best seen in FIG. 1) which is interposed between the float 20 and the gyro case 30, such that the float 20 is supported by and floats in the fluid 10; means (generally designated 70) for sensing the temperature $T_F$ of the float 20, the temperature $T_C$ of the gyro case 30, and the difference between the two temperatures $T_F$ and $T_C$, with the temperature $T_F$ of the float 20 being higher than the temperature $T_C$ of the gyro case, and with this temperature sensing means 70 being operably associated with the float 20 and with the gyro case 30; and, means (generally designated 80) for raising the temperature $T_C$ of the outer container 30 to the temperature $T_F$ of the float 20, with this temperature raising means 80 being operably associated with the gyro case 30 and also with the temperature sensing means 70.

It is here to be noted that the preferred embodiment of the inventive gyroscope system 60 includes the gyroscope assembly 40 and the inventive temperature controller assembly 50. With the latter assembly 50 including the temperature sensing means 70 and the temperature raising means 80.

Now with reference to FIGS. 2 and 3 and to the temperature sensing means 70 shown therein, that means 70 includes, but is not limited to: a first temperature sensitive resistor 72 (such as a thermistor or nickel wire), FIGS. 2 and 3, which is in contact with the outer surface of the wall of the float 20, and which is in electrical connection with a source of electricity 76, FIG. 3; and, a second temperature sensitive resistor 74 (such as a thermistor, or nickel wire), FIGS. 2 and 3, which is in contact with the outer surface of the wall of the gyro case 30, and which is in electrical connection with the source of electricity 76, FIG. 3. It is to be noted, as can be seen in FIG. 3, that the two temperature sensitive resistors 72 and 74, and the source of electricity 76, are constituent components of a Wheatstone bridge circuit. It is also to be noted that the temperature sensing means 70, which more precisely is a means for sensing the temperature respectively of the float 20 and the gyro case 30 and also for sensing/ascertaining the difference in those temperatures (i.e., $T_F$-$T_C$), further includes a differential amplifier 78, FIG. 3, in electrical connection with the Wheatstone bridge circuit, as is shown in FIG. 3.

Now, with reference to FIGS. 2 and 3 and to the means 80 for raising the temperature $T_C$ of the gyro case 30 to the temperature $T_F$ of the float 20, that means 80 includes an electrical heater 82 (e.g., a heater coil) which is in contact with the gyro case 30 (e.g., surrounds the gyro case) and which is in electrical connection with the differential amplifier 78, FIG. 3.

Still with reference to FIGS. 2 and 3, therein is shown the result of practising the steps of the method portion of the instant invention. It is here to be remembered that the inventive method is for use in controlling (i.e., preventing, or minimizing) the error-causing heat convections (such as H1 and H2, FIG. 1) of a fluid (such liquid 10, FIG. 1) which is interposed between a sealed inner container (such as float 20, FIGS. 1 and 2) which houses a gyroscope (such as navigational gyro 40, FIG. 2) and a sealed outer container (such as gyro case 30, FIGS. 1 and 2) which houses the inner container 20, where the temperature $T_F$ of the inner container 20 is higher than the temperature $T_C$ of the outer container 30.

The inventive method comprises, essentially, the below-described steps.

Firstly, ascertaining the temperature $T_F$ of the wall of the inner container 20, FIGS. 1 and 2. This is done with the use of means 70, FIGS. 2 and 3, and particularly with the use of first temperature sensitive resistor 72.

Next, ascertaining the temperature $T_C$ of the wall of the outer container 30, FIGS. 1 and 2, this is done with the use of means 70, FIGS. 2 and 3, and particularly with the use of second temperature sensitive resistor 74.

Lastly, raising the temperature $T_C$ of the outer container 30 to the temperature $T_F$ of the inner container 20. Thereby, the temperatures of the inner container 20 of the outer container 30, and of the fluid 10 therebetween are equal (or approximately equal, i.e., the temperature difference across the fluid gap is zero (or approximately zero); and, as a consequence, the error-causing heat convections (such as H1 and H2, FIG. 1) of the fluid 10 are eliminated (or at least minimized). This is done with the use of means 80, FIGS. 2 and 3, and more particularly with the use of heater 82.

It is here to be noted that the aforesaid inventive method may be varied by including another step between the step of ascertaining the temperature $T_C$ of the outer container 30 and the step of raising the temperature $T_C$ of the outer container 30 to the temperature $T_F$ of the inner container 20. That step, which is intermediate these two steps may comprise the step of ascertaining the difference in temperature (i.e., $T_F$-$T_C$) of the two containers 20 and 30. In fact, this variation of the method is preferred, and this step may be accomplished with the use of the differential amplifier 78, FIG. 3, which is in electrical connection with the Wheatstone bridge circuit which is also shown in FIG. 3.

CONCLUSION

It is abundantly clear from all of the foregoing, and from the contents of the Figures of the drawing, that the stated objects (as well as objects related thereto) of the instant invention have been achieved.

It is to be noted that, although there have been described and shown the fundamental and unique features of the invention apparatus of the instant invention, as applied to a preferred embodiment (i.e., as shown in FIGS. 2 and 3), nevertheless other embodiments, variations, and the like may occur to and can be made by those of ordinary skill in the art.

Additionally, because of the teachings herein, it may occur to others of ordinary skill in the art that, in appropriate particular circumstances, the number of the basic and fundamental steps of the inventive method can be increased, decreased, or otherwise varied, and/or that their sequence can be changed. In this regard it is to be noted that, in spite of any variation of the steps of the inventive method of the instant invention, only the same desired (and already-attained) results will be obtained.

What is claimed is:

1. A gyroscope assembly, comprising:
    a. a gyroscope;
    b. a sealed inner container which houses said gyroscope;
    c. a sealed outer container which houses said inner container;
    d. a fluid interposed between said inner container and said outer container, whereby said inner container is supported by and floats in said fluid;
    e. means, operably associated with said inner container and said outer container, for sensing the temperature respectively of said inner and outer containers and the difference in temperature thereof, wherein the temperature of said inner container is higher than the temperature of said outer container; and
    f. means, operably associated with said outer container and with said means for sensing the temperature respectively of said inner and said outer containers and the difference thereof, for raising the temperature of said outer container to the temperature of said inner container.

2. A gyroscope assembly, as set forth in claim 1, wherein said gyroscope is an inertial navigational gyroscope.

3. A gyroscope assembly, as set forth in claim 1, wherein said fluid is a liquid.

4. A gyroscope assembly, as set forth in claim 1, wherein said inner and outer containers are cylindrical in shape.

5. A gyroscope assembly, as set forth in claim 1, wherein said means for raising the temperature of said outer container to the temperature of said inner container includes an electrical heater in contact with said outer container.

6. A gyroscope assembly, as set forth in claim 1, wherein said means for sensing the temperature respectively of said inner and said outer containers and the difference in temperature thereof includes:
    a. a first temperature sensitive resistor in contact with said inner container, and in electrical connection with a source of electricity; and
    b. a second temperature sensitive resistor in contact with said outer container, and in electrical connection with said first temperature sensitive resistor and with said source of electricity;

whereby said first and second temperature sensitive resistors and said source of electricity are constituents of a Wheatstone bridge circuit.

7. A gyroscope assembly, as set forth in claim 6, wherein means for sensing the temperature respectively of said inner and said outer containers and the difference in temperature thereof further includes a differential amplifier in electrical connection with said Wheatstone bridge circuit.

8. A gyroscope assembly, as set forth in claim 6, wherein said means for raising the temperature of said outer container to the temperature of said inner container includes an electrical heater in contact with said outer container and in electrical connection with said differential amplifier.

9. A method of controlling the error-causing heat convections of a fluid interposed between a sealed inner container which houses a gyroscope and a sealed outer container which houses said inner container, wherein the temperature of said inner container is higher than the temperature of said outer container, which method comprises the steps of:
    a. ascertaining the temperature of said inner container;
    b. ascertaining the temperature of said outer container; and
    c. raising the temperature of said outer container to the temperature of said inner container;

whereby the temperature of said inner container, of said outer container, and of said fluid therebetween are approximately equal, and said error-causing heat convections of said fluid are eliminated.

10. A method, as set forth in claim 9, wherein:
    a. said gyroscope is an inertial navigational gyroscope;
    b. said fluid is a liquid;
    c. said inner and outer containers are cylindrical in shape;
    d. said inner container is supported by and floats in said liquid;

e. said temperature of said inner container is ascertained by the use of a first sensor;
f. said temperature of said outer container is ascertained by the use of a second sensor; and
g. said temperature of said outer container is raised to the temperature of said inner container by the use of a heater.

11. A method, as set forth in claim 9, which comprises the additional step of ascertaining the difference in temperature of such inner container and of said outer container, wherein this step is performed between said step of ascertaining the temperature of said outer container and said step of raising the temperature of said outer container to the temperature of said inner container.

12. A method, as set forth in claim 11, wherein said difference in temperature of said inner container and of said outer container is ascertaind by use of a differential amplifier.

* * * * *